June 5, 1956 B. A. HUMLICEK 2,748,551

DISK TRANSPORT

Filed July 31, 1953 2 Sheets-Sheet 1

INVENTOR

BERNARD A. HUMLICEK

BY

McMorrow, Berman & Davidson

ATTORNEYS

DISK TRANSPORT

Filed July 31, 1953

2 Sheets-Sheet 2

INVENTOR

BERNARD A. HUMLICEK

BY

McMorrow, Berman & Davidson

ATTORNEYS

United States Patent Office 2,748,551 Patented June 5, 1956

2,748,551

DISK TRANSPORT

Bernard A. Humlicek, Linwood, Nebr.

Application July 31, 1953, Serial No. 371,502

1 Claim. (Cl. 55—73)

This invention relates to disk harrows, and more particularly to improved transport devices for disk harrows.

The main object of the invention is to provide a novel and improved transport device for a disk harrow, said transport device being simple in construction, being easy to attach to the disk harrow, and providing a safe and reliable means for supporting a disk harrow in an elevated position so that it may be transported from one place to another.

A further object of the invention is to provide an improved transport device for a disk harrow, said device being inexpensive to fabricate, being rugged in construction, requiring a minimum amount of time for the attachment thereof to a disk harrow to be transported, and involving only a small amount of manual effort to elevate the disk harrow from its ground-engaging position to its lifted position for transportation.

Further objects and advantages of the invention will become apparent from the following description and claim, and from the accompanying drawings, wherein:

Figure 2:
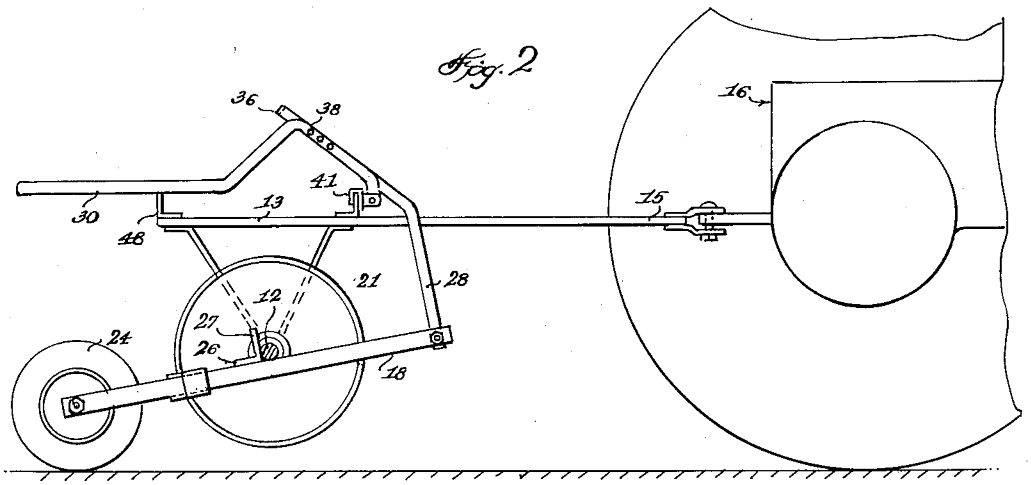
Figure 2 is an enlarged longitudinal vertical cross sectional view taken on the line 2—2 of Figure 1.

Referring to the drawings, and more particularly to Figures 1 to 7, a conventional disk harrow is designated generally at 11, said disk harrow being of the type having a transversely extending disk supporting shaft 12 carried by and located below a transverse rectangular frame 13, said frame being connected to the forwardly convergent frame 14 which includes the drawbar 15 for connecting the harrow to a tractor 16. Designated at 17 and 17' are respective transport devices according to the present invention, said transport devices being located below the opposite side portions of the disk transport device 11 and being symmetrically identical in construction. Each disk transport device comprises a pair of longitudinally extending frame bars 18 and 19, the frame bar 19 being inwardly offset at its intermediate portion, as shown at 20 to conform with the concave side of a harrow disk 21 adjacent to which the frame bar 19 is positioned, as will be presently described, and the frame bar 18 being outwardly offset, as shown at 22 so that it may be located adjacent the convex portion of a disk 21 in the manner shown in Figure 5. Respective sleeve members 23, 23 are provided on the rear portions of the frame bars 18 and 19, the sleeve members 23, 23 being of resilient deformable material, such as rubber or the like, and being disposed adjacent portions of the disk members 21, 21 nearest to the frame bars, to prevent damage to said disk members by contact with the frame bars.

Journaled between the rear ends of the frame bars 18 and 19 is the ground-engaging wheel 24. The rear portions of the frame bars 18 and 19 are rigidly connected by an intermediate transverse bar member 25, shown in Figure 5, and are further connected at their offset portions by a transversely extending angle bar 26 having the upstanding flange 27 adapted to engage rearwardly of the disk harrow shaft 12, as is clearly shown in Figure 5.

Pivotally connected at 27 between the forward ends of the frame bars 18 and 19 is a link bar 28, said link bar being bent forwardly at an obtuse angle to define the forwardly offset knee portion 29. Designated at 30 is a handle lever which is bent forwardly to define the forwardly offset knee portion 31 at the lower end of the handle lever, the depending lower portion of the lever, shown at 32 being formed with a plurality of apertures 33. The upper portion of the link bar 28 is formed with similarly spaced apertures 34 which are registerable with the apertures 33.

Figures 4, 5, 7, 8:
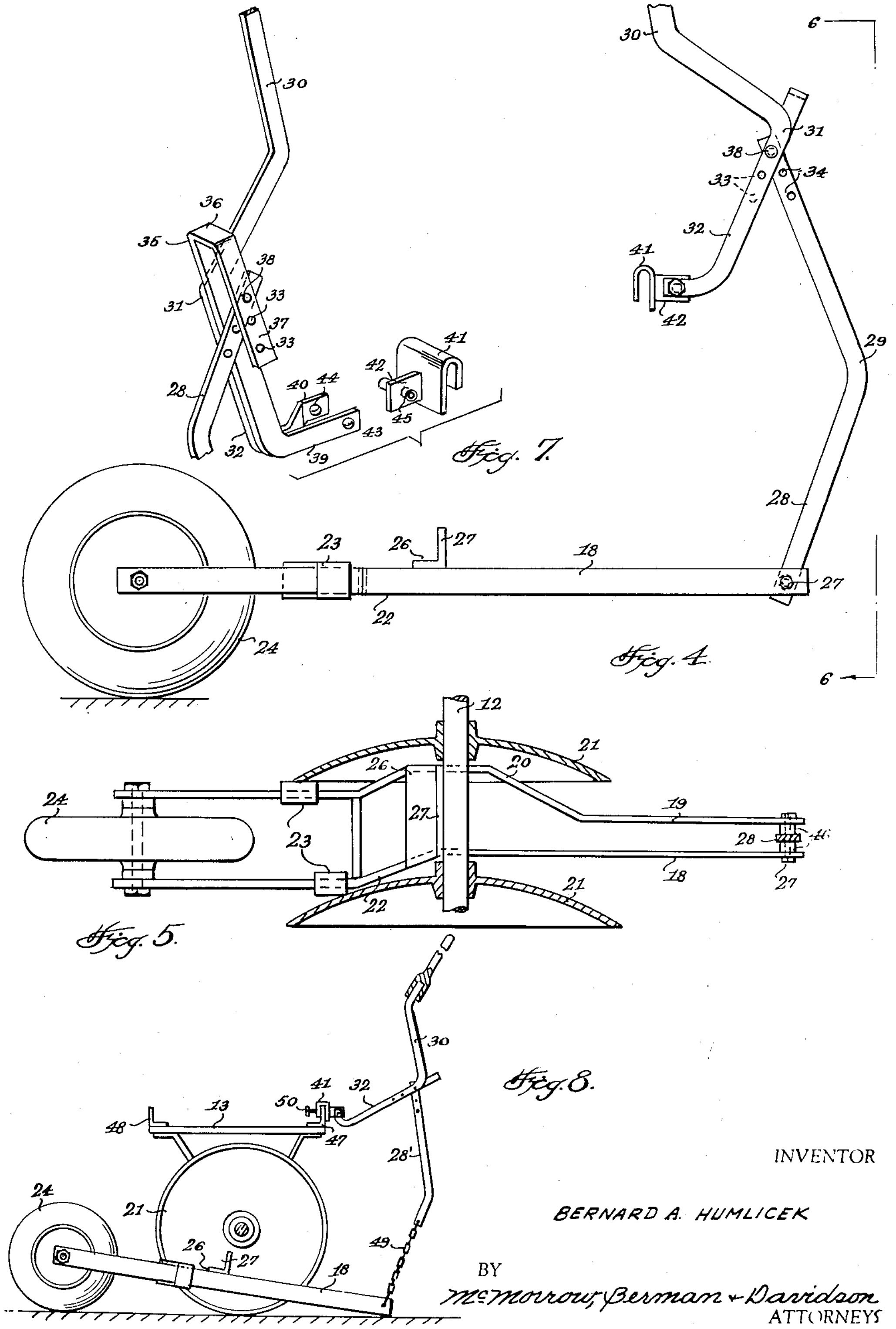
Figure 4 is a side elevational view of one of the disk harrow transport devices employed in Figure 1.
Figure 5 is an enlarged horizontal cross sectional view taken on the line 5—5 of Figure 3.
Figure 7 is a fragmentary perspective view showing the components of the forward portion of one of the disk harrow transport devices in separated positions.
Figure 8 is a side elevational view, partly in vertical cross section, showing a modified form of disk harrow transport device according to the present invention.

As shown in Figure 7, the lower end of the handle lever 30 includes the hooked bar member 35 rigidly welded to the lower portion of the handle lever 30, the bar member 35 having the hook element 36 provided with the depending arm portion 37 provided with the aforesaid spaced apertures 33. The top end portion of the link bar 28 is received within the hook 36, as is clearly shown in Figure 7, and is pivotally connected to the depending arm 37 at 38, namely, at the uppermost apertures 33 and 34.

The members 35 and 30 are formed at their lower ends with the rearwardly angled portions 39 and 40, the portion 40 being laterally offset with respect to and extending parallel to the portion 39. Designated at 41 is a hook member formed with the vertical lug 42 which is receivable between the portions 40 and 39 and which is pivotally connected to said portions by transverse bolt means extending through apertures 43 and 44 provided in the members 39 and 40 and through an aperture in the lug 42, suitable spacer bushings 45 being provided for the transverse pivot bolt between lug 42 and the members 39 and 40. As shown in Figure 5, similar spacer bushings 46 are provided on the transverse pivot bolt 27 between the link bar 28 and the respective frame bars 18 and 19.

Figures 1, 3:
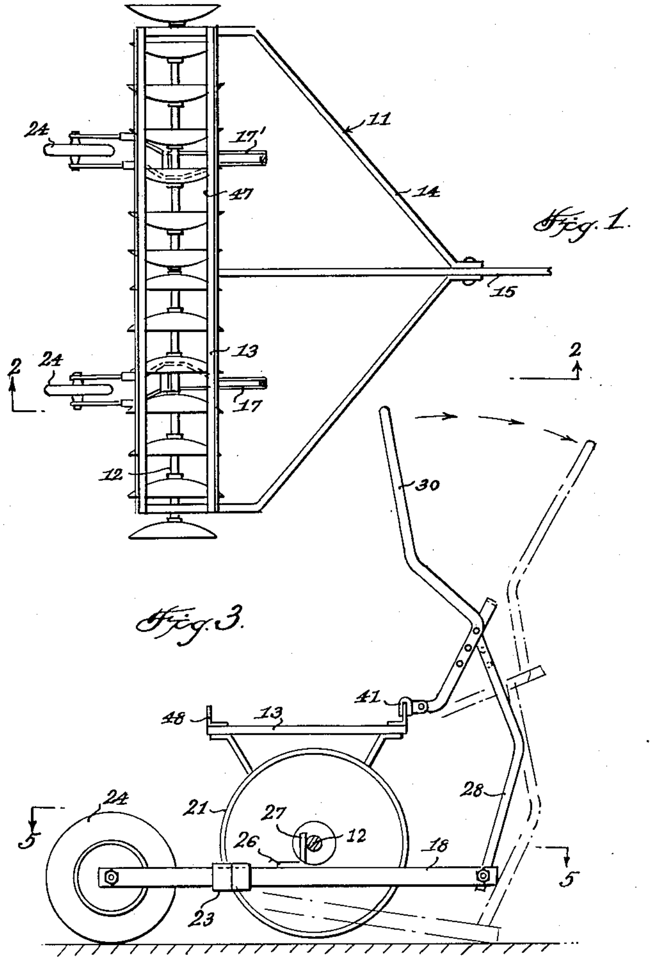
Figure 1 is a top plan view of a disk harrow provided with improved transport devices constructed in accordance with the present invention.
Figure 3 is a view similar to Figure 2 but showing the disk harrow in a partially lowered position.
Figure 6:
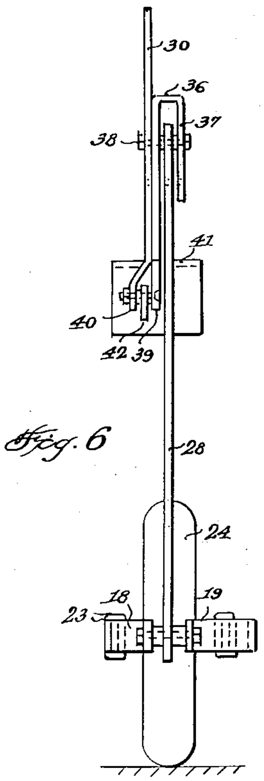
Figure 6 is a front elevational view of the disk transport device taken on the line 6—6 of Figure 4.

In using the disk transport devices 17 and 17', the frame portions of said devices are arranged beneath the frame 13 of the disk harrow 11 in the manner illustrated in Figure 1, the frame bars 18 and 19 being disposed between adjacent disks 21, 21 and the upstanding flange 27 of the angle bar 26 being disposed rearwardly adjacent the disk shaft 12. The hook member 41 of each of the transport devices 17 and 17' is engaged on the upstanding vertical flange of the forward transverse angle bar 47 of the disk harrow frame 13 in the manner shown in Figure 3 and the handle levers 30 are then rotated counter-clockwise, as viewed in Figure 3, to rotate the handle lever from the initial dotted line position thereof shown in Figure 3 to the final position thereof shown in Figure 2, wherein the upper portion of the handle lever 30 engages the top edge of the vertical flange of the rear angle bar 48 of the disk harrow frame 13. The lower portion of the handle lever 30 is offset a proper amount such that in the position shown in Figure 2, the arm 32 of the handle lever is substantially in alignment with the top arm of the link bar 28, as shown in Figure 2, whereby the lower apertures 34 of the link bar 28 are in registry with the lower apertures 33 in the depending arm 37 of hook member 35.

The handle lever 30 may then be locked in this position by inserting a locking bolt through a set of registering apertures 33 and 34, thereby locking the handle lever 30 against rotation with respect to the link bar 28. As is readily apparent from Figure 2, the disk harrow frame 13, the disk shaft 12 and the disk 21 are thus securely locked in elevated positions above the ground and are supported on the ground-engaging wheels 24 of the disk transport devices 17 and 17'. The disk harrow may thus be transported to any desired location in this elevated position, and may be lowered to ground-engaging position when it has arrived at its intended location by unlocking the handle levers 30 and rotating said handle levers clockwise to the dotted line positions of said handle levers shown in Figure 3, whereupon the transport devices may be removed.

Referring now to the form of the invention shown in Figure 8, the lower end of the link bar 28', corresponding to the link bar 28 in the form of the invention shown in Figures 1 to 7, may be connected to the forward ends of the frame bars 18 and 19 by flexible chains 49, the chains 49 being provided with suitable hooks at their lower ends which may be detachably engaged with the transverse bolt 27 connecting the frame bars 18 and 19, whereby the chains 49 may be readily unhooked from said transverse bolt to allow the frame bars 18 and 19 and their associated ground-engaging wheels 24 to be removed from beneath the disk harrow without requiring the removal of the link bar 28', the handle lever 30 and the remaining elements of the upper portions of the disk transport devices. Thus, said upper portions may be attached to the forward transverse angle bar 13 of the harrow frame and may be carried with the harrow frame at all times, whereas the lower portions of the transport devices, namely, the portions comprising the frame bars 18 and 19 and the ground-engaging wheels 24 may be used only when it is desired to move the disk harrow from one location to another, at which time the chains 49 are engaged with the transverse bolt 27 in the manner above described.

As shown in Figure 8, a set screw 50 may be provided, said set screw extending through the front flange of the hook member 41 and being clampingly engageable with the vertical flange of the angle bar 47 to lock the hook member 41 to said vertical flange.

While certain specific embodiments of an improved transport device for a disk harrow have been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A transport device for a disc harrow having a transversely extending disc-supporting shaft and a frame structure connected to and extending above the shaft, comprising: a frame bar extending in a fore-and-aft direction transversely of and below the shaft in supporting relation thereto, a ground wheel on the rear end of said bar, an abutment mounted on the frame bar between the ends of the frame bar and adapted for engaging the supported harrow shaft against movement in at least one direction longitudinally of the frame bar, handle lever support means detachably connectable to the harrow frame structure, a handle lever fulcrumed upon said means, and a link pivotally connected to the handle lever at a point spaced from the fulcrum of said handle lever and the front end of the frame bar, rocking of the handle lever in one direction shifting the link upwardly to swing the frame bar in an upward direction about the axis of said wheel thereby to elevate the harrow, rocking of the lever in an opposite direction swinging the frame bar downwardly out of supporting relation to the harrow shaft, the handle lever having an offset portion extending at an angle to the portion connected to the fulcrum when swung in said first direction thereof shifting into a subsantially horizontal position overlying said frame structure in contact with the frame structure at a location spaced from said means, portions of the handle lever and link extending parallel to and adjacent each other in said handle lever position, said portions being adapted to be fixedly connected in their parallel and adjacent relation to lock the link and handle lever against relative movement in said position of the handle lever, thereby to fixedly engage the harrow shaft and frame structure between said frame bar and handle lever on elevation of the frame structure.

References Cited in the file of this patent

UNITED STATES PATENTS

| | | |
|---|---|---|
| 555,143 | Wicks | Feb. 25, 1896 |
| 2,620,610 | Chambers | Dec. 2, 1952 |
| 2,641,885 | Ireland | June 16, 1953 |